(12) United States Patent
Rosener

(10) Patent No.: US 9,979,473 B2
(45) Date of Patent: May 22, 2018

(54) SYSTEM FOR DETERMINING A LOCATION OF A USER

(71) Applicant: Plantronics, Inc., Santa Cruz, CA (US)

(72) Inventor: Douglas K Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days. days.

(21) Appl. No.: 14/926,824

(22) Filed: Oct. 29, 2015

(65) Prior Publication Data
US 2017/0123047 A1 May 4, 2017

(51) Int. Cl.
H04B 10/114 (2013.01)
G01S 1/70 (2006.01)
H04W 64/00 (2009.01)
G01S 5/16 (2006.01)

(52) U.S. Cl.
CPC ............ *H04B 10/1141* (2013.01); *G01S 1/70* (2013.01); *G01S 5/16* (2013.01); *H04W 64/00* (2013.01)

(58) Field of Classification Search
CPC ... G01S 1/70; G01S 5/161; G01S 5/16; H04B 10/114–10/1141; H04B 10/11–10/116
See application file for complete search history.

(56) References Cited

U.S. PATENT DOCUMENTS

| | | | |
|---|---|---|---|
| 6,798,392 B2 * | 9/2004 | Hartwell | A42B 3/046 345/158 |
| 8,363,098 B2 | 1/2013 | Rosener et al. | |
| 2003/0152392 A1 * | 8/2003 | Mansbridge | H04B 10/505 398/199 |
| 2004/0145470 A1 * | 7/2004 | Fager | G01S 5/0018 340/539.13 |
| 2005/0200476 A1 | 9/2005 | Forr et al. | |
| 2007/0165812 A1 | 7/2007 | Lee et al. | |
| 2007/0177161 A1 * | 8/2007 | Ishii | G01S 1/70 356/614 |
| 2008/0199167 A1 * | 8/2008 | Daly | G06T 5/006 396/72 |
| 2010/0040252 A1 * | 2/2010 | Thompson | H04R 1/083 381/375 |
| 2010/0042848 A1 | 2/2010 | Rosener | |
| 2012/0242978 A1 | 9/2012 | Reuss | |

(Continued)

OTHER PUBLICATIONS https://www.pcmag.com/encyclopedia/term/44185/headset.*
(Continued)

*Primary Examiner* — David Payne
*Assistant Examiner* — Casey Kretzer
(74) *Attorney, Agent, or Firm* — Thomas S. Dienwiebel

(57) ABSTRACT

A system for determining a location of a user is provided that comprises a plurality of transmitters, each associated with a predefined physical location and each comprising a light source to provide an optical location signal; and at least one head-worn locator device with an optical receiver for receiving at least one of the optical location signals. To allow the determination of a location of a user that is wearing the head-worn locator device, each transmitter is configured to provide location information in the respectively provided optical location signal, wherein said location information corresponds to said predefined physical location of the respective transmitter.

17 Claims, 11 Drawing Sheets

(56) References Cited

U.S. PATENT DOCUMENTS

2013/0336660 A1* 12/2013 Chin .................. G01S 1/70
398/118
2014/0040252 A1* 2/2014 Jarvis ................ G06F 17/3087
707/724
2014/0292636 A1 10/2014 Rosener
2015/0280829 A1* 10/2015 Breuer .................. G01C 3/32
398/118

OTHER PUBLICATIONS

Unknown, "Indoor Positioning—Factsheet," found at URL <http://www.newscenter.philips.com/pwc_nc/main/standard/resources/corporate/press/2014/innovation-experience/factsheet-indoor-positioning.pdf>, Sep. 2014.
Robarts, "Supermarket's "indoor sat-nay" Guides Shoppers to Discounts," found at URL <http://www.gizmag.com/carrefour-philips-indoor-positioning-system/37631/>, May 21, 2015.
John Nelson, "Fujitsu Unveils Smart Headgear for Industrial Segment," Plus Plastic Electronics, May 15, 2015, found at URL <https://www.plusplasticelectronics.com/wearables/fujistu-unveils-smart-headgear-for-industrial-segm>, 3 pages.
Prabha Subramani et al., "Smart Headgear," International Journal of Engineering Research & Technology (IJERT) 2(2):1-3, Feb. 2013, 3 pages.

* cited by examiner

SYSTEM FOR DETERMINING A LOCATION OF A USER

CROSS-REFERENCE TO RELATED APPLICATIONS

The contents of utility patent publication US 2010/0066821 A1 "INFRARED DERIVED USER PRESENCE AND ASSOCIATED REMOTE CONTROL", filed on Sep. 16, 2008 are incorporated herein by reference for all purposes to the extent that such contents is not inconsistent with the present application.

TECHNICAL FIELD

The present invention relates to the field of computer science and more particularly to location detection with wearable devices, in particular for indoor use.

BACKGROUND

In the recent past, wearable "smart" devices became commercially available for a multitude of applications. Some of these applications require data on the current location of the device and its user. Accordingly, wearable devices are available that include a GPS module for satellite location detection. Other wearable devices allow to track the distance travelled, e.g., using an accelerometer sensor, but not the exact location of the device and its user.

Both of the aforesaid options provide disadvantages. Determining the distance travelled in most instances does not allow determining the user's location, even when combined with Wi-Fi or cellular assisted positioning, at least not to a typically desired accuracy. Using a GPS module instead certainly provides data of the user's location, which may be sufficient for many applications. However, GPS receivers typically have a high power consumption when switched on, which requires frequent recharging, in particular considering the typically small form factor of a wearable device and the accordingly limited battery capacity. Furthermore, it is known that determining the location using GPS takes a relatively long time for the necessary signal acquisition and analysis, which is why so-called "assisted GPS" modules were developed, using Wi-Fi or cellular signals to speed up the location determination. These modules however increase the power consumption even further. At last, a major drawback of GPS positioning is that, due to the frequency of the satellite GPS signals and the low transmission power density, determining a location using GPS is typically not possible indoors or in areas with poor satellite reception.

Accordingly, an object exists to provide an improved system for determining a location of a user, in particular for indoor use.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, a system for determining a location of a user is provided, comprising at least one head-worn locator device and a plurality of transmitters. Each transmitter is associated with a predefined physical location and comprises at least a light source to provide an optical location signal. The head-worn locator device has at least one optical receiver for receiving at least one of said optical location signals. Each transmitter is configured to provide location information in the respectively provided location signal. The location information corresponds at least to the predefined physical location of the respective transmitter.

The basic idea of this aspect of the present invention is to provide a system for user positioning with multiple transmitters and at least one head-worn locator device. The transmitters are configured to emit a signal comprising location information, which upon reception by the head-worn locator device allows to obtain information referring to the current location of the head-worn locator device and, i.e., the user. The system according to the present invention can be used outdoors, but also indoors without the need for, e.g., elaborate and power consuming satellite positioning hardware.

According to another aspect of the present invention, a head-worn locator device for use in a system for determining a location of a user is provided. The head-worn locator device comprises at least one optical receiver for receiving at least one optical location signal, where said optical location signal comprises location information, corresponding to a predefined physical location of a transmitter.

These aspects and other aspects of the invention will be apparent from and elucidated with reference to the embodiments described hereinafter.

DETAILED DESCRIPTION OF PREFERRED EMBODIMENTS

Figure 1:
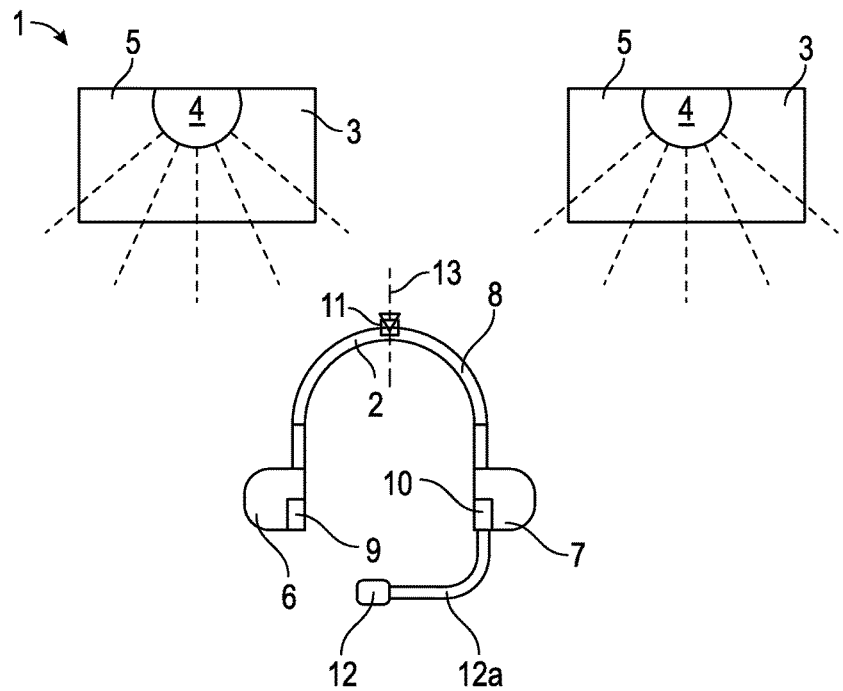
FIG. 1 shows a first embodiment of a system for determining an indoor location of a user with a head-worn locator device and multiple transmitters in a schematic view.

Technical features described in this application can be used to construct various embodiments of systems and methods for determining a location of a user according to the preceding and following description. Some embodiments of the invention are discussed so as to enable one skilled in the art to make and use the invention.

In the following explanation of the present invention according to the embodiments described, the terms "connected to" or "connected with" are used to indicate a data connection/transmission link between at least two components, devices, units, or modules. Such a connection may be direct between the respective components, devices, units, or modules or indirect, i.e. over intermediate components, devices, units, or modules. The connection may be permanent or temporary; wireless or conductor based.

For example, a connection may be provided over a WAN (wide area network), LAN (local area network), PAN (personal area network), comprising the Internet, Ethernet networks, cellular networks, Bluetooth networks, Zigbee networks, and/or Wi-Fi networks using a corresponding suitable communications protocol.

According to a first exemplary aspect, a system for determining a location of a user is provided, comprising a head-worn locator device and a plurality of transmitters.

The head-worn locator device comprises at least one optical receiver, configured to receive at least one optical location signal from at least one of the transmitters, i.e., when said head-worn locator device is in transmission range of the respective transmitter.

The head-worn locator device may be of any suitable type and may certainly comprise one or more additional components. The term "head-worn locator device", also referred to as "head mounted wearable locator device" or "head-wearable device", in this context is understood to refer to a device, which is configured to at least during use be worn on or attached to the user's head and/or neck.

For example, the head-worn locator device may be provided as or being integrated with a head mounted display, glasses, a hat, or a headset. It is noted that in the context of this application, the term "headset" comprises all types of headsets, headphones, and other head-worn audio devices, such as for example circumaural and supra-aural headphones, earbuds, in-ear headphones, and earphones. Head-worn devices provide an excellent reception of the optical location signal in particular in case of a ceiling-mount transmitter array, while allowing hands-free operation. In one embodiment, the head-worn device may be battery powered and at least during use cordless.

In the context of the present explanation, the term "optical location signal" is understood as providing optical communication using visible, infrared, and/or ultraviolet light. The terms "location signal" and "optical communication" are used herein interchangeably with "optical location signal".

As discussed above, the head-worn locator device comprises the at least one optical receiver for receiving said optical location signal. The optical receiver may be of any suitable type and may be adapted to the requirements of the respective signal type of the location signal. For example, the optical receiver may comprise one or more photo detectors, photodiodes, and/or camera modules, adapted for the respective wavelength or wavelength range of the optical location signal.

In a one alternative or additional example, the optical location signal is a short-range signal, for example having a transmission/reception range of a maximum of 5 m from the respective transmitter.

Each transmitter of the system for determining a location of a user according to the present aspect is associated with a predefined physical location and comprises at least the light source to provide said optical location signal. The light source may be of any suitable type and may comprise one or more LEDs, lasers, incandescent lamps, halogen lamps, and/or other type of light generating device. The light source may emit visible, IR, and/or UV light. In one embodiment, the transmitter is formed integrally with a light fixture, such as a ceiling or wall light fixture.

It should be apparent that the light source of the transmitter should be configured to communicate with the receiver of the locator device, using an identical and/or at least compatible wavelength and signal type. In an embodiment, each transmitter comprises multiple light sources, wherein at least some of the light sources provide the optical location signal.

Each transmitter is configured to provide location information in the respectively emitted location signal. The location information is thus wirelessly provided to the head-worn locator device, when the latter is in transmission range of the signal of the respective transmitter. According to the present aspect, the location information transmitted corresponds to the predefined physical location of the associated transmitter and thus allows the head-worn locator device to determine the location of the user.

In the context of the present explanation, the term "predefined physical location" refers to a physical or geographical location of the respective transmitter. The predefined physical location may correspond to an absolute location, as identified by longitude, latitude, and/or elevation, correspond to a relative location, such as a defined position, relative to a reference, and/or correspond to a logically defined position, such as a room, building, section, or department, e.g., identified by a room number or department identifier. While multiple transmitters may be associated with the same predefined physical location, e.g., to provide redundancy, the predefined physical location of at least two of said plurality of transmitters differs from each other. In one embodiment, the predefined physical locations are "quasi-unique", providing that at least in the respectively defined logical space of the system, such as the respective building or room, each predefined physical location is unique.

The transmitted location information may at least comprise said predefined physical location of the respective transmitter or correspond at least to said predefined physical location. In the latter case, the predefined physical location may be determined by the head-worn locator device from a location ID or code, transmitted in said optical location signal, using an internal or external lookup table, map, and/or database, as will be discussed in more detail in the following description.

The location information may be encoded in said location signal according to any analog or digital communications protocol, suitable for the respective transmission type. In one embodiment, the location information is digital location information and provided in said optical location signal using amplitude, phase, and/or frequency modulation. For example, on-off keying (OOK) may be used to provide the digital location information. In one additional embodiment and in case of an optical communication using visible light, the frequency of modulation is selected to be at least 60 Hz.

Using the transmitted location information, it is possible for the head-worn locator device to determine its location or position and thus the location or position of the user when she or he is wearing the locator device, even in areas without GPS reception, such as indoors. It is noted that the term "location" in this context may refer to a relative or an absolute location, as discussed in the preceding with reference to the term "predefined physical location".

According to the present aspect, the system for determining a location of the user comprises at least a head-worn locator device and a plurality of transmitters. Certainly, the system may comprise more than one head-worn locator device, e.g., for locating multiple users. The number of transmitters in the system according to the present aspect can be selected according to the respective application. In general, the number will depend on the desired "location resolution", i.e., the positioning accuracy or spatial resolution. It should be apparent that a higher number of transmitters typically results in a higher positioning accuracy than a lower number of transmitters.

The head-worn locator device and the transmitters may be of any suitable type and in particular comprise a computing device, having at least a processor with memory/storage comprising a suitable programming/software to provide at least part of the functionality discussed in the preceding and also in the following description. The software can include a kernel, operating system and/or a shell or interface. One or more application programs or modules may be "loaded", i.e., transferred from storage into memory for execution by the processor of the respective device.

In one embodiment, the system is adapted for indoor operation, i.e., for indoor positioning/indoor location determination.

In another additional or alternative embodiment, the transmitters are fixed-location or fixed-position transmitters. For example, the transmitters may have a suitable mounting base for at least one of ceiling, wall, floor, and furniture fixation, such as, e.g., shelf mounting. In a further alternative or additional embodiment, the transmitters are formed integrally with a further device, such as a lighting unit, as will be explained in detail in the following description.

As discussed in the preceding, the number of transmitters in the system is not limited. In a typical embodiment, the system may comprise more than two transmitters and in particular more than 10 transmitters. In typical exemplary setups, the system may comprise tens or hundreds of transmitters, depending on the application and the desired positioning accuracy.

The positioning of the transmitters may be chosen according to the application. For example, in a typical office building one transmitter per room may provide sufficient results for many applications. Certainly, it is possible to increase the location resolution by decreasing the spacing of the transmitters. For example, it the above-mentioned office building setup, the transmitters may be arranged with a 1 m spacing for high resolution location detection.

In one embodiment, a plurality of transmitters is arranged in at least one array, e.g., in rows and/or columns. For example, the transmitters may be arranged in said array with a consistent or even spacing to each other, i.e., equidistant. It is noted that in additional embodiments, the system may comprise multiple arrays of transmitters, such as wall and/or ceiling arrays. Furthermore, the array(s) in additional embodiments may comprise all or some of the transmitters of the system. The system in the latter case comprises array-arranged transmitters and non array-arranged transmitters. At least one array may be a one-dimensional array.

In a further additional or alternative embodiment, at least one array is a two-dimensional array, arranged in a transmitter array plane. A two-dimensional array arrangement may, e.g., be useful for ceiling-mount or wall-mount applications, such as for office buildings. Correspondingly, the transmitter array plane may, e.g., be arranged horizontally or vertically. In another embodiment, the transmitters are configured so that the light sources emit substantially perpendicular to the transmitter array plane, along or parallel to a transmitter optical axis.

According to a further alternative or additional embodiment, the optical receiver of said head-worn locator device at least during use is aligned substantially with said transmitter optical axis, i.e., oriented substantially perpendicular to the transmitter array plane. The present embodiment allows to safely receive one of the optical location signals. It will be apparent that when using non-collimated light to emit the location signal, a cone of light is emitted by the light source of the respective transmitter. Accordingly, angular deviations of approx. 20 to 60 degrees between the transmitter optical axis of the light source and an optical axis of the receiver are possible.

In an exemplary horizontal ceiling-mount transmitter array arrangement, the light source and/or the optical receiver are oriented substantially vertically (e.g., +−45°). The two components thus are arranged facing each other, i.e., arranged for transmission and reception aligned with a vertical optical axis.

In an additional or alternative embodiment, the head-worn locator device is configured to provide audio feedback to the user upon the reception of location information, e.g., of the determined physical location and/or viewing information. The head-worn locator device may be configured to provide the audio feedback using a connected or integrated audio component, such as in the case of the head-worn locator device being formed integrally with a headset, using the corresponding headphones of the headset.

In one additional embodiment, said head-worn locator device additionally comprises a viewing direction detector to additionally determine viewing information of the user. The present embodiment allows, for example in a supermarket or department store environment, not only to determine the location of the user, e.g., the respective aisle and location along the aisle, but also the viewing direction and thus the respective shelf or product the user is looking at. It should be apparent that the determination of the viewing direction is based on the user wearing the locator device on his head. In the following, the term "viewing direction" is also is referred to as "orientation" with respect to the locator device, and "horizontal viewing angle" with respect to a reference axis, such as the North-South cardinal direction.

In one embodiment, the viewing information additionally comprises a vertical viewing angle of the user. In this embodiment, the viewing direction detector is additionally configured to determine said vertical viewing angle of the user with respect to a horizontal reference plane.

The viewing direction detector may be of any suitable type and may for example comprise a compass, a gyrocompass, an acceleration sensor, an inclinometer, and/or any other type of tilt/pan sensor to obtain the viewing information.

In another embodiment, the viewing direction detector determines the horizontal viewing angle from the optical receiver. For example, in case the receiver comprises a camera module, it is possible to obtain the orientation of the locator device and thus the horizontal viewing angle of the user by determining the relative positioning of multiple transmitters that are present in the field of view of the camera module. It should be apparent that, e.g., in case a first transmitter is on the left side of the field of view of the camera module and a second transmitter is on the right side of the field of view of the camera module, it is possible to determine the orientation if at least the positioning of both transmitters relative to each other are known. Higher resolution angles can be obtained by determining the detailed position of the transmitters in the camera's field of view.

Certainly, instead of the use of a camera module, determination of the orientation of the locator device is also possible in case the optical receiver comprises multiple photo detectors or photodiodes to receive signals from multiple transmitters at the same time.

In another alternative or additional embodiment, the viewing direction detector comprises one or more secondary optical receivers, configured to receive optical location signals of further transmitters, such as wall- or shelf-mounted transmitter. In one example, at least one of the secondary optical receivers is oriented or aligned along the user's viewing axis at least during use, i.e., when the user is wearing the head-worn locator device. In case the secondary optical receivers comprise camera modules, a more precise viewing angle may be calculated by determining the position of the detected location signal, e.g., of a wall- or shelf-mounted transmitter, in the field of view of the camera module.

As discussed in the preceding, the location information may comprise the predefined physical location of the respective transmitter in range or correspond to the predefined physical location, e.g., in the latter case comprising a location identifier (ID) or location code.

In one further additional or alternative embodiment, the head-worn locator device additionally comprises a communication interface and is configured to at least transmit the received location information using said communication interface to a mapping device. The mapping device in an additional embodiment comprises the aforementioned lookup table, map, and/or database and is configured to determine the predefined physical location, associated with the respective transmitter from which the optical location signal was received by the head-worn locator device. In another additional embodiment, the mapping device is configured to provide the predefined physical location back to the head-worn locator device, e.g., using again the communication interface.

Certainly, the present embodiment may be used in conjunction with the determination of the viewing angles of the user, as described in the preceding. In an according embodiment, the head-worn locator device in addition to the location information transmits the viewing information, e.g., the horizontal viewing angle and/or the vertical viewing angle, to the mapping device. In this case, the mapping device may additionally provide user view field information back to the head-worn locator device.

The communication interface may be of any suitable type to communicate with the mapping device over a wired and/or wireless communication medium. For example, the communication interface may be adapted for communication using the Internet Protocol over a WAN, LAN, cellular connection, Bluetooth connection, and/or Wi-Fi Network. Certainly, the communication interface may be adapted for further communication methods and protocols, such as IR-Transmission, Zigbee or any other suitable method and protocol.

The mapping device may be of any suitable type and in particular comprise a computing device. For example, the mapping device may be a computer, server, smart phone, smart watch, or other smart device, e.g., with a suitable programming/software.

In another embodiment, the head-worn locator device comprises a mapping memory with mapping information. The head-worn locator device in this embodiment is configured to determine said predefined physical location of said transmitter by comparing said location information with said mapping information. According to the present embodiment, the determination of the predefined physical location is conducted locally, e.g., without the necessity of an external device. The mapping information accordingly may comprise the aforementioned lookup table, map, and/or database that allows to associate the received location information with a predefined physical location of a transmitter. Certainly and corresponding to the preceding, the mapping information in another embodiment additionally or alternatively may comprise user view field information. The mapping memory may be of any suitable type, such as RAM, ROM, a HDD, an SSD, or flash memory.

According to a further alternative or additional embodiment, said optical location signal of each of the transmitters comprises redundant location information. The present embodiment provides a further improved location detection reliability due to the redundancy, i.e., that the location information can be derived from the optical location signal even if only part of said location signal is received by the head-worn locator device, such as under non-optimal reception conditions. For example, the optical location signal could comprise convolutionally encoded location information and/or one or more checksums.

In another alternative or additional embodiment, the head-worn locator device is configured to receive two or more optical location signals simultaneously. To allow the simultaneous reception of two or more optical location signals, the optical receiver may be correspondingly configured, e.g., with two or more photo detectors or photodiodes or with one or more camera modules, as discussed in the preceding.

The present embodiment allows increasing the location resolution without the necessity of providing further transmitter or decreasing the spacing between the transmitters. For example, in case two transmitters are in the field of view of a camera module, where both of the transmitters provide location information, it is possible to obtain an intermediate physical location by interpolation. The respective interpolation could be conducted by the head-worn locator device or by the mapping device, discussed in the preceding.

In one example of an arrayed setup of the transmitters, if two or more transmitters are detected simultaneously along a given array axis, the location of the head-worn device is determined at the center of the segment, that connects the detected transmitters.

As will be apparent, it is thus possible to obtain "finer-grained" information location with fewer transmitters.

Reference will now be made to the drawings in which the various elements of embodiments will be given numerical designations and in which further embodiments will be discussed.

Specific references to components, process steps, and other elements are not intended to be limiting. Further, it is understood that like parts bear the same reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a first embodiment of a system for determining an indoor location of a user 1 in a schematic view. The system 1 comprises a head-worn locator device, i.e. in the present embodiment an audio headset 2, and two transmitters 3. The transmitters 3 shown in FIG. 1 are lighting fixtures and comprise an overhead or ceiling mountable lamp housing 5 and several LED modules 4. Each LED module 4 comprises a plurality of white light LEDs (not shown) for general room illumination purposes. The LED modules 4 are connected to an LED controller 18 (not shown in FIG. 1).

The headset 2 according to the embodiment of FIG. 1 is of stereo configuration and comprises a left 6 and a right 7 earphone housing, connected with each other by head band 8. Each earphone housing comprises an associated earphone driver 9, 10 to provide audio to the user when wearing the headset 2. A microphone 12 is provided at an end of extension arm (boom) 12a to capture user audio. In addition to the aforesaid components, the headset 2 according to the present embodiment comprises a camera module 11, which is formed on head band 8. The camera module 11 is oriented vertically and facing upwards as indicated by receiver axis 13, which is during use aligned with an optical axis of the transmitters 3. The camera module 11 is of PAC7366 type, available from PixArt Imaging, Inc., Taiwan and is configured to receive at least one optical location signal from one of the transmitters 3 when the headset 2 and thus the user is close to the respective transmitter 3, i.e., within a distance of typically 1-5 m.

Figure 2:
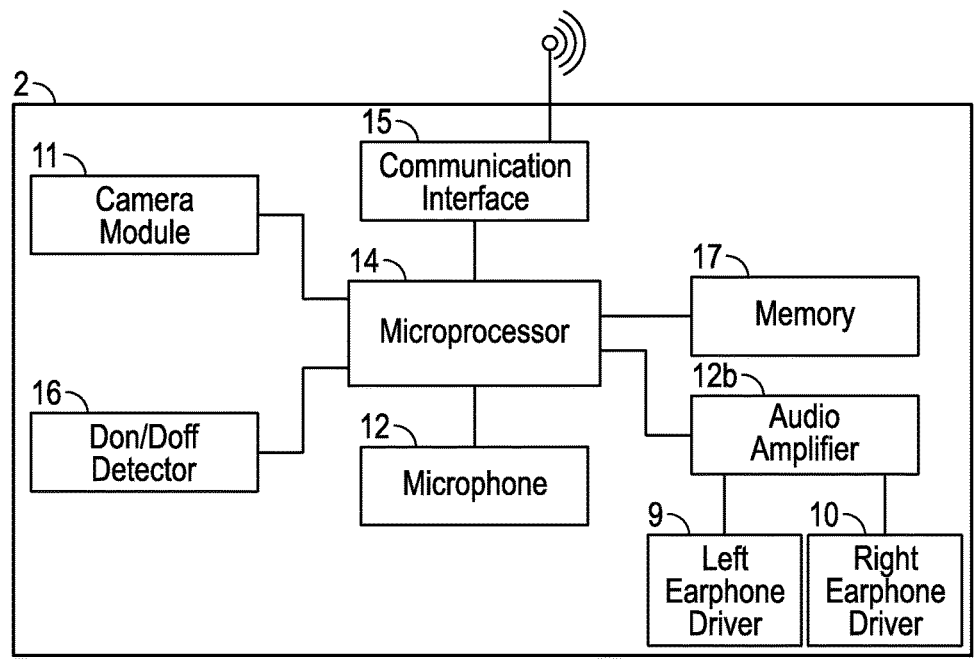
FIG. 2 shows a schematic block diagram of the head-worn locator device according to the embodiment of FIG. 1.

The camera module 11 is connected to a microprocessor 14, as shown in the block diagram of headset 2 of FIG. 2. For reasons of clarity of the drawing, the microprocessor 14, arranged in the right earphone housing 7, and some of the further components of the block diagram of FIG. 2 are not shown in the schematic view of FIG. 1.

Microprocessor 14 receives video image information from said camera module 11 and detects the presence of an optical location signal in said video information and thus, whether the user is near to one of the transmitters 3. The microprocessor 14 further controls and processes the audio I/O of microphone 12 and the earphone drivers 9, 10, the latter of which are connected to microprocessor 14 over an audio amplifier 12b. It is noted that microprocessor 14 comprises an integrated digital sound processor (DSP) to process the audio I/O and in particular an audio input signal of microphone 12 and an audio output signal for amplifier 12b.

The headset 2 further comprises a communication interface 15, which provides a wireless connection to a smart phone (not shown) using the Bluetooth protocol. A worn state (don/doff) detector 16 is connected with microprocessor 14 to determine, whether the user is wearing the headset 2 or not. A memory unit 17 is provided that stores suitable programming to allow the microprocessor 14 to provide at least the operation, discussed in the following with reference to FIG. 4. A rechargeable battery (not shown) is arranged in the left earphone housing 6, which provides the components of headset 2 with power.

Figure 3:
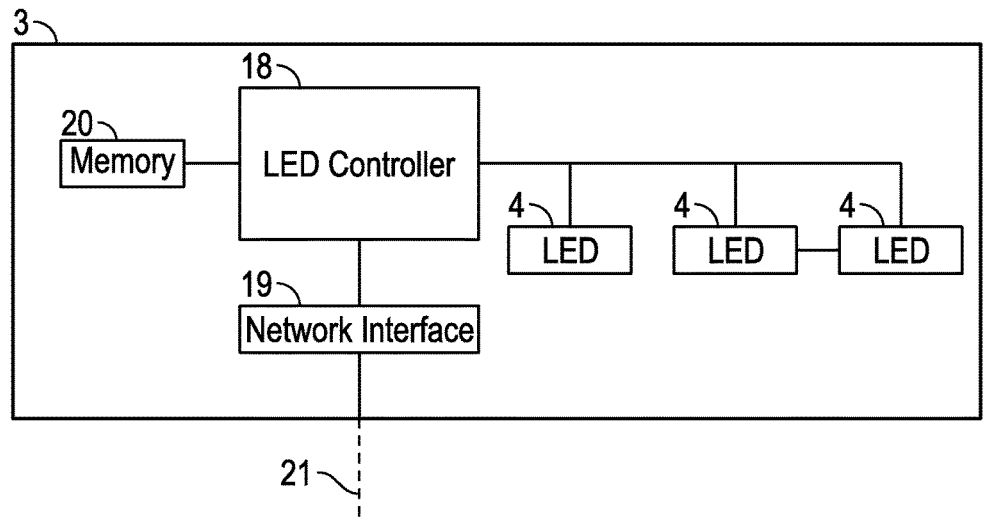
FIG. 3 shows a schematic block diagram of one of the transmitters according to the embodiment of FIG. 1.

As discussed in the preceding with reference to FIG. 1, each transmitter 3 comprises a plurality of white light LED modules 4 for general room illumination purposes that are connected to an LED controller 18. FIG. 3 shows a schematic block diagram of the transmitter 3. The LED controller 18 is connected with each of the LED modules 4 to control the ON/OFF state of the LED modules 4 according to the desired room illumination. In addition, the LED controller 18 controls the LED modules 4 to emit the optical location signal, i.e., in the present embodiment an amplitude modulated digital signal, which comprises location information that corresponds to a predefined physical location of the respective transmitter 3. The network interface 19, connected with LED controller 18, allows to control the ON/OFF state of the LED modules 4 from a central mapping server (not shown) over an Ethernet connection 21. The network interface 19 furthermore allows to program the transmitter 3, and more precisely memory 20, with the location information. The network interface 19 according to the present embodiment is configured for Ethernet communication using a corresponding conductor-based network connection 21.

Memory 20 comprises, after being programmed, the respective location information. In addition, memory 20 comprises suitable programming to allow the LED controller 18 to operate the LED modules 4, as discussed in the preceding. Transmitter 3 further comprises a mains power source (not shown) to power the aforementioned components.

In the following exemplary explanation of the operation of indoor location determination system 1, a plurality of light fixtures with integrated transmitters 3 are installed in a drop ceiling of a department store.

After the installation of the transmitters 3 in the ceiling, each transmitter 3 is programmed with location information that corresponds to a predefined physical location over the Ethernet connection 21 of network interface 19. The predefined physical location according to the present example is a relative location of a section or a department of the department store according to the following database table. It is noted that depending on the size of the respective department and the desired "location resolution", multiple of the transmitters 3 may share the same predefined physical location.

While the respective location information, comprising a "location identifier (ID)", is provided by said transmitters 3 in the optical location signals, the associated predefined physical locations are stored together with the location information in a remote lookup database table, which is stored in the central mapping server, discussed above. As will be apparent from the database table, the location information in this example is of 8 bits length.

| | Remote lookup database | |
|---|---|---|
| Transmitter No. | Predefined physical location | Location information (with location ID) |
| 1 | Women's clothing - Coats | 01011011 |
| 2 | Women's clothing - Dresses | 00100010 |
| 3 | Women's clothing - Sports wear | 01010101 |
| 4 | Men's clothing - Suits | 00000111 |
| 5 | Men's clothing - Coats & jackets | 00011110 |
| 6 | Women's shoes | 00111000 |
| 7 | Men's shoes | 01011100 |
| 8 | Children's clothing | 01011111 |
| 9 | Toys | 00000000 |
| 10 | Cosmetics | 11111111 |

Once the transmitters 3 are programmed, the LED controller 18 of the respective transmitter 3 causes the corresponding LED modules 4 to emit the optical location signal with location information by digitally modulating the output light, provided that the respective LED modules 4 are in the ON state, i.e., that the general illumination in the part of the department store is switched on. The modulating frequency is selected greater than 60 Hz so that no visible flicker in the emitted light is caused by the modulation. The location signal is emitted repeatedly until the respective LED modules 4 are switched off, such as after closing of the department store.

Figure 4:
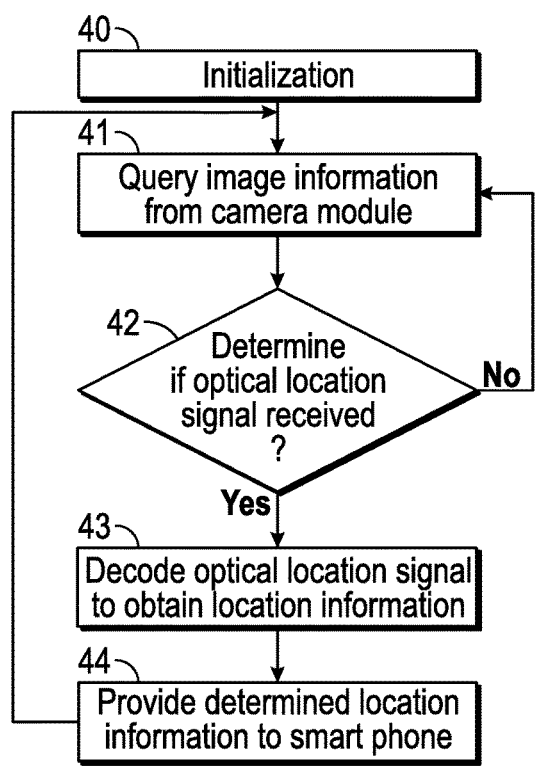
FIG. 4 shows an example of the operation of the head-worn locator device according to the embodiment of FIG. 1 in a schematic flow chart.

FIG. 4 shows a schematic flowchart of the operation of the headset 2 according to the above exemplary embodiment.

Powering on the headset 2 in step 40 initializes the same and initiates the location determination. The microprocessor 14 in step 41 queries the camera module 11 for said video image information and determines in step 42, whether the video information comprises an optical location signal from one of the transmitters 3. If this is not the case, the procedure returns to step 41.

If an optical location signal is received in step 42, the microprocessor 14 decodes/demodulates the received signal in step 43, in the present embodiment to obtain the location information, i.e., the location ID of the respective transmitter 3 from which the location signal was received.

In step 44, the location information is transmitted to a smart phone (not shown) over the communication interface 15 using Bluetooth. The smart phone then connects to the remote lookup database, provided on the mapping server (not shown), over a Wi-Fi connection to obtain the respective predefined physical location, associated with the received location information. The smart phone accordingly transmits the received location ID to said mapping server and receives back the associated predefined physical location of the respective transmitter 3. For example, if the location ID "00111000" is received, the predefined physical location, determined by the mapping server in accordance with the above table is "Women's shoes".

The smart phone may use the predefined physical location for example to show the user's location on a displayed map of the department store or to provide current shopping deals of the respective department to the user.

Once the location information is transmitted to the smart phone in step 45, microprocessor 14 queries the camera module 11 again in step 41 and repeats the aforesaid process steps until the headset 2 is powered off.

Figure 5:
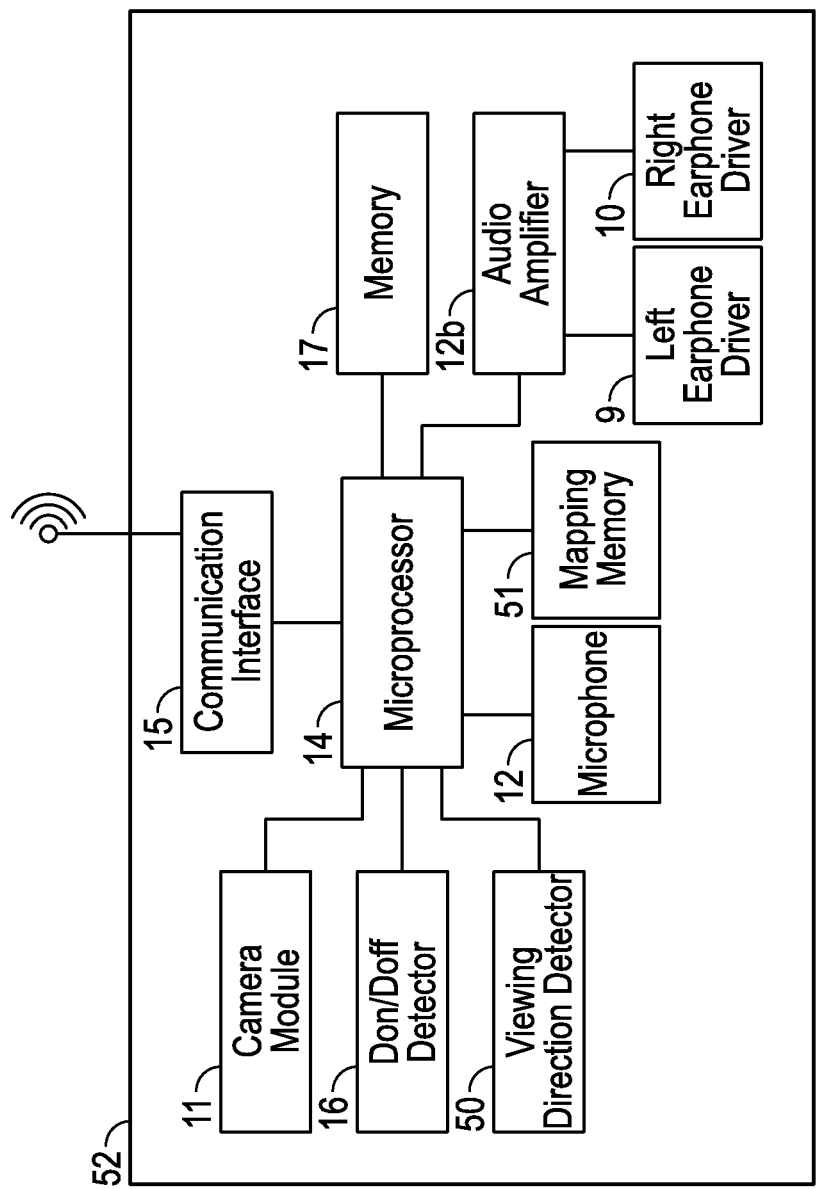
FIG. 5 shows a further embodiment of a head-worn locator device in a schematic block diagram.

FIG. 5 shows a further embodiment of a headset 52 in a schematic block diagram. The headset 52 corresponds to the headset 2, discussed in the preceding with reference to the embodiment of FIG. 2, with the exception of an additional viewing direction detector 50 and mapping memory 51. The viewing direction detector 50 determines the horizontal viewing angle or orientation, as well as the vertical viewing angle of the user.

The viewing direction detector 50 according to the present embodiment is arranged in one of the left or a right earphone housings 6, 7 of the headset 52 and comprises an MPU-9250 motion-tracking device, marketed by InvenSense, Inc., San Jose, Calif., USA, which allows to determine a compass direction and a tilt/pan angle. The mapping memory 51 of headset 52 according to the present embodiment comprises a local lookup database to obtain the respective predefined physical location once the location information is received.

As will be apparent, the present embodiment allows to obtain user view field information and thus to determine what is in the user's field of view. In the preceding example of the use of the system 1 in a department store, the present embodiment allows to determine what product segment the user is looking at more precisely, which may be particularly useful for visually impaired persons.

In the present embodiment, the following information is stored in the local lookup database of mapping memory 51. For reasons of clarity, only two transmitter locations are discussed in the database table. However, it is noted that the embodiment certainly is not limited thereto and can comprise a different number of database transmitter entries. Furthermore, an average height of 6 feet of the user and a centered position in the respective aisle of the department store, i.e., directly under the transmitter/lighting fixture 3 is assumed to match the vertical viewing angle with the view field information provided.

| | | Local lookup database | | | |
|---|---|---|---|---|---|
| Transmitter No. | Predefined physical location | View field information | Location information (location ID) | Horizontal angle | Vertical angle |
| 1 | Women's clothing | Winter coats rack | 01011011 | 5°-160° | all |
| 1 | Women's clothing | Summer coats rack | 01011011 | 190°-340° | all |
| ... | ... | | ... | ... | ... |
| 6 | Women's shoes | Size 6 shelf | 00111000 | 25°-140° | 120°-130° |
| 6 | Women's shoes | Size 7 shelf | 00111000 | 25°-140° | 110°-120° |
| 6 | Women's shoes | Size 8 shelf | 00111000 | 25°-140° | 100°-110° |
| ... | ... | | ... | ... | ... |

Figure 6:
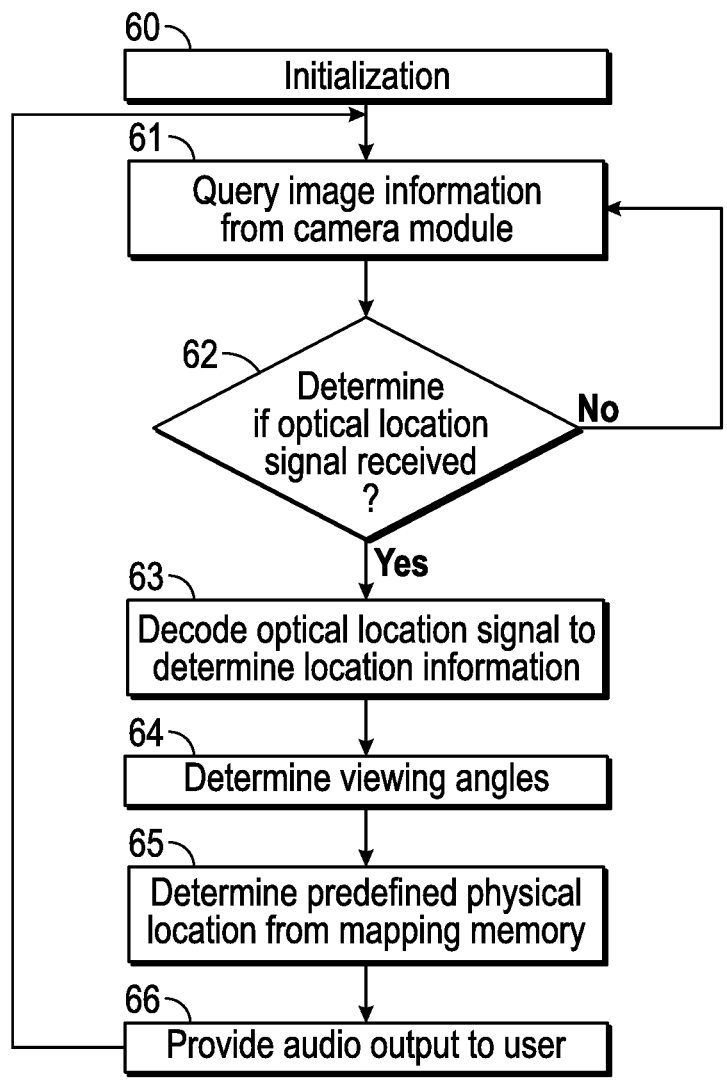
FIG. 6 shows an example of the operation of the head-worn locator device of FIG. 5 in a schematic flow chart.

The operation of headset 52 is shown in the schematic flow chart of FIG. 6. The operation corresponds to the operation described in the preceding with reference to FIG. 4, with the exception of steps 64-66.

Powering on the headset 2 in step 60 initializes the same and initiates the location determination. The microprocessor 14 in step 61 queries the camera module 11 for said video image information and determines in step 62, whether the video information comprises an optical location signal from one of the transmitters 3. If this is not the case, the operation returns to step 61.

If an optical location signal is received in step 62, the microprocessor 14 decodes/demodulates the location signal in step 63 to obtain the respective location information of the optical location signal received.

In step 64, the horizontal viewing angle and the vertical viewing angle is determined by querying viewing direction detector 50. Subsequently in step 65, microprocessor 14 determines the predefined physical location associated with the determined location information and the user view field information according to the readings of the viewing direction detector 50 from mapping memory 51.

For example, in case that the location information received from the associated transmitter comprises "00111000", the horizontal viewing angle/orientation is east, i.e., 90°, and the horizontal viewing angle is 115°, the predefined physical location is determined as "Women's shoes" and the user view field information is "Size 7 shelf".

Accordingly in step 66, the microprocessor 14 provides the following audio output to the user: "You are in the women's shoes department. You are looking at the size 7 shelf". The procedure is then repeated as explained in the preceding with reference to FIG. 4, except that the audio output in step 66 is only provided again upon a determination of a change of the user's location or the user's field of view.

Deviations from the average height and centered position, as discussed above, are interpolated in this embodiment by microprocessor 14 of headset 52 in steps 63 and 64 to further improve the view field information accuracy. The actual height of the user, and thus the headset 52 when being worn, may be pre-set in the headset 52 during an initial setup stage or a calibration step. Microprocessor 14 then adjusts the vertical angle of the local lookup database on the basis of the difference between the actual height of the user and the average height.

A deviation from the centered position with respect to the transmitter 3 is also used to adjust the vertical viewing angle, comprised in the local lookup database. A corresponding deviation is detected by the microprocessor 14 by determining the relative position of the optical location signal of transmitter 3 in the pixel video information, provided by camera module 11. In case of an offset, i.e., the optical location signal being non-centered in the video information, said offset is also used to adjust the vertical viewing angle to improve the angular accuracy.

Both deviations, height and position, are calculated using standard trigonometry and interpolation.

Figure 7:
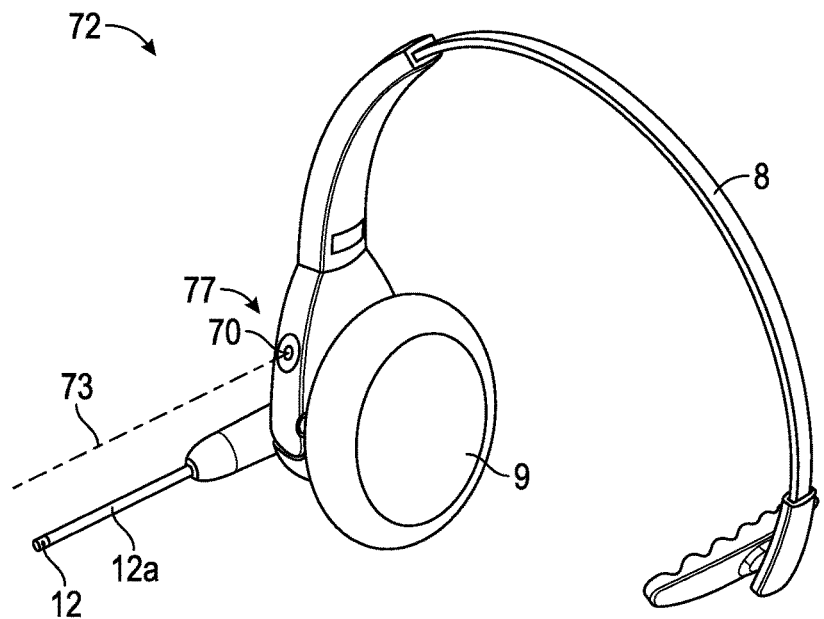
FIG. 7 shows a further embodiment of a head-worn locator device in a schematic perspective view.

FIG. 7 shows a further embodiment of a headset 72 in a perspective, schematic view. The headset 72 corresponds to headset 2 of FIG. 1 with the exception that headset 72 is a mono headset and thus only has a single earphone housing 77 with a corresponding earphone driver 9. Instead of the aforesaid camera module, the headset 72 comprises an infrared (IR) receiver 70, which allows to determine the intensity of an optical location signal from a transmitter 3. As will be apparent from FIG. 7, the IR receiver 70 during use/wearing of the headset 72 is forward facing and is oriented along horizontal detector optical axis 73

Figure 8:
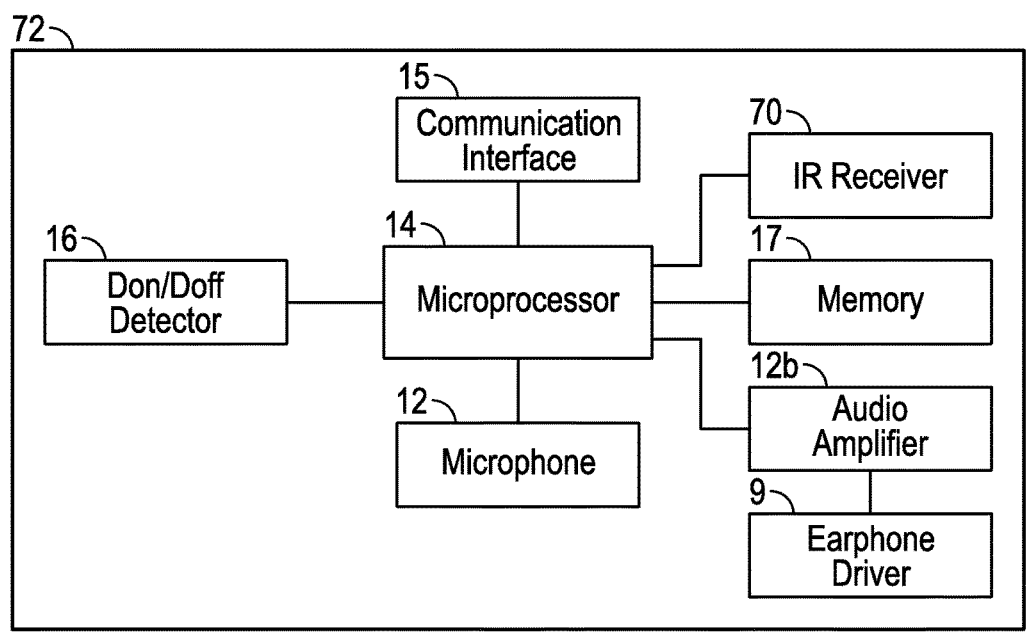
FIG. 8 shows a schematic block diagram of head-worn locator device of FIG. 7.

FIG. 8 shows a schematic block diagram of headset 72, which except for the above differences, corresponds to the embodiment of FIG. 2.

Figure 9:
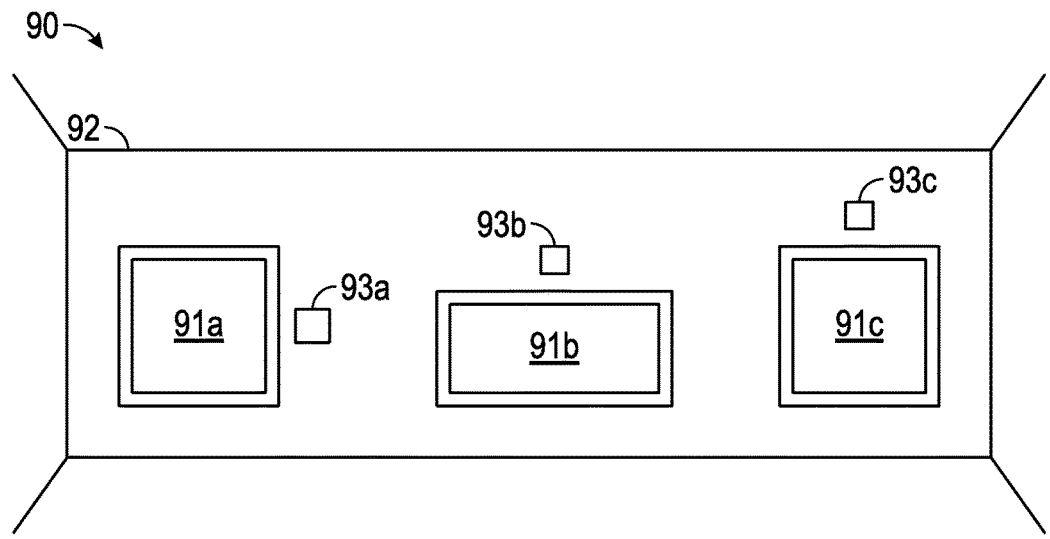
FIG. 9 shows an exemplary museum environment in a schematic view.

The headset 72 according to the embodiment of FIGS. 7 and 8 may be useful, e.g., for a location determination in a museum environment 90, such as shown in the schematic exemplary view of FIG. 9. Here, various paintings 91*a-c* are arranged on a wall 92. Each painting 91*a-c* has an associated infrared transmitter 93*a-c*, which provides the respectively associated location information in corresponding infrared optical location signals, corresponding to the preceding embodiments.

Figure 10:
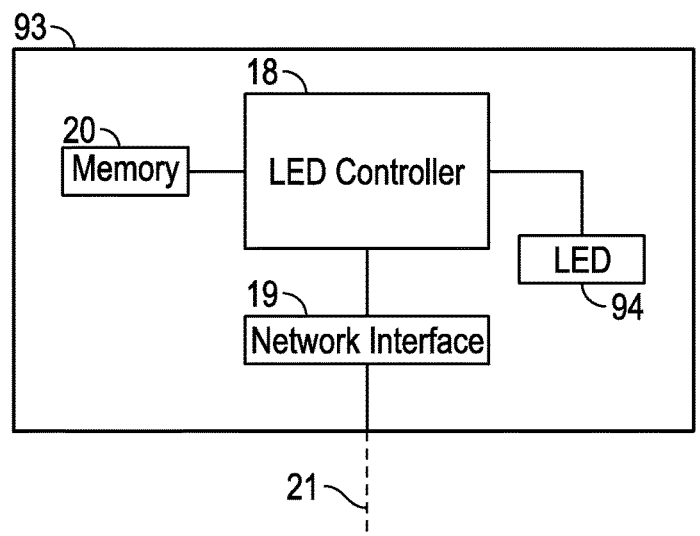
FIG. 10 shows a schematic block diagram of a transmitter for use with the embodiments of FIGS. 7-9.

A schematic block diagram of a transmitter 93 is shown in FIG. 10. The transmitter 93 according to the present embodiment corresponds to the embodiment of FIG. 3, with the exception that instead of multiple white light illumination LED modules, one infrared LED module 94 is provided.

During operation, the transmitters 93 provide location information to head-worn locator devices, such as headset 72, using amplitude modulated infrared light. According to the present embodiment, the location information comprises the respective predefined physical location, namely the respective name of the painting according to the following table.

| Transmitter No. | Predefined physical location/ Location information |
|---|---|
| 93a | Three Musicians - Pablo Picasso |
| 93b | The Night Watch - Rembrandt van Rijn |
| 93c | Starry Night - Vincent van Gogh |
| ... | ... |
| ... | ... |

Certainly, the bit length of the location information in this embodiment is increased compared to the transmission of a location ID according to the preceding embodiments.

Figure 11:
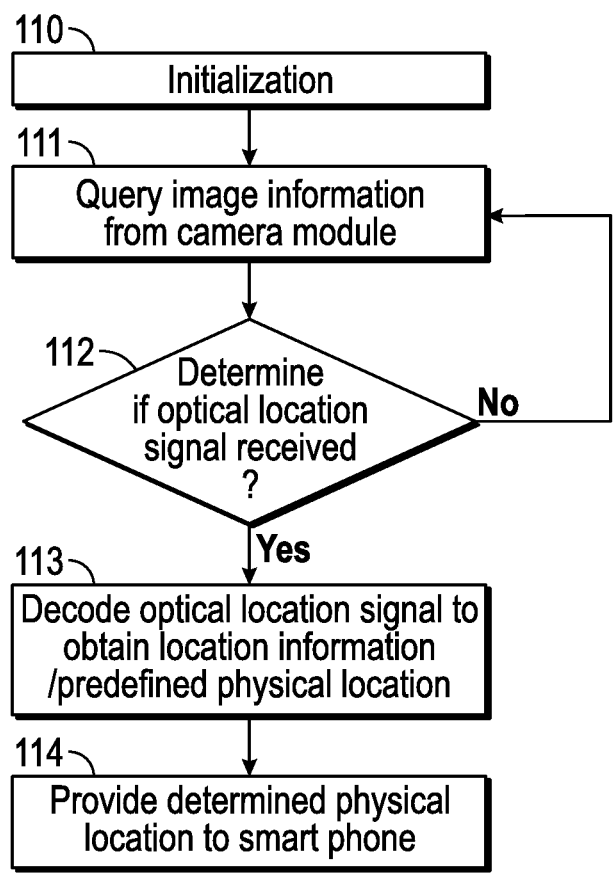
FIG. 11 shows an example of the operation of the head-worn locator device according to the embodiments of FIGS. 7-10 in a schematic flow chart.

The operation of the present embodiment is shown in a schematic block diagram in FIG. 11. The operation in steps 110-113 corresponds to the operation of steps 40-43 of FIG. 4. In step 114, the microprocessor 14 of the headset 72 provides the determined predefined physical location to the smart phone (not shown), which may, e.g., provide the following display output: "You are looking at Starry Night of Vincent van Gogh" when the location signal of transmitter 93*c* is received.

The procedure is then repeated as explained in the preceding with reference to FIG. 4. It is noted that the arrangement of IR receiver 70 as explained with reference to the embodiment of FIG. 7 allows to determine the location, i.e., the proximity to one of the transmitters 93*a*-93*c*, but also the viewing direction, as a location signal can only be received by the IR receiver 70 in case the user is at least roughly facing the respective transmitter 93*a*-93*c*. It is further noted that in the present embodiment, an infrared sensitive camera could be used instead of the IR receiver 70.

Figure 12:
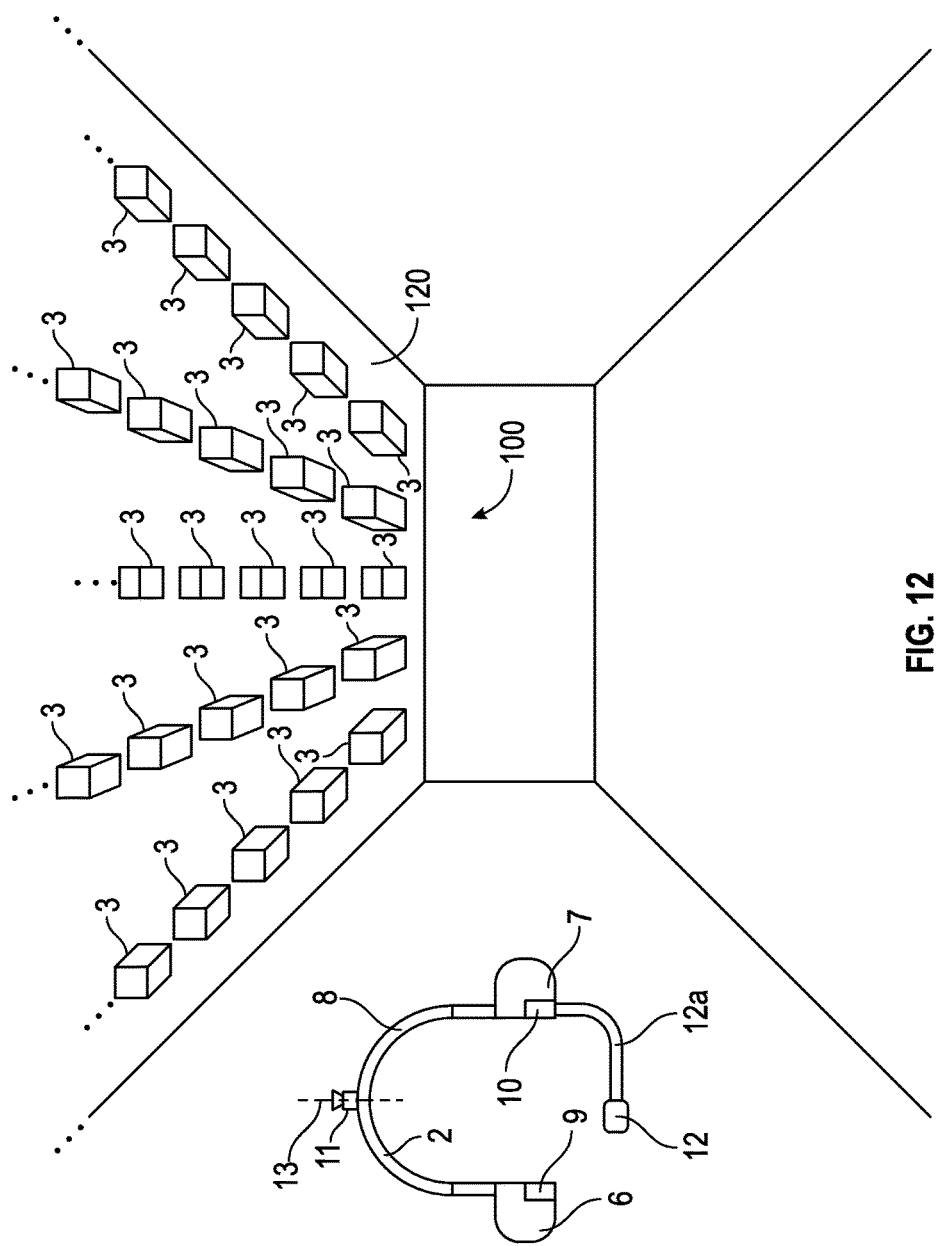
FIG. 12 shows another embodiment of a system for determining an indoor location of a user with a two-dimensional array of transmitters in a schematic, perspective view.
Figure 13:
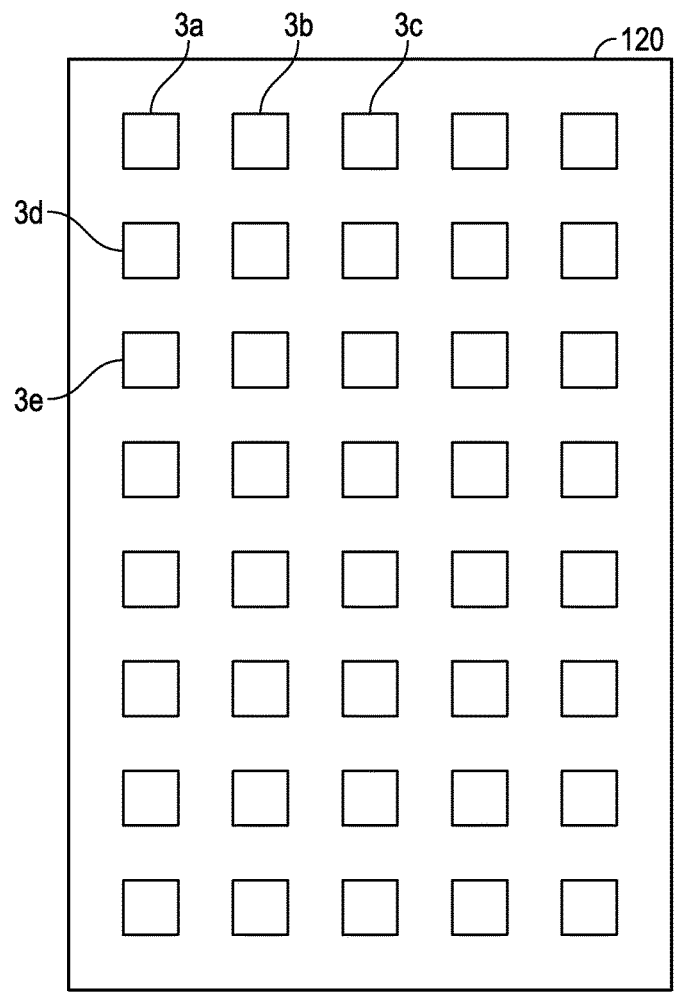
FIG. 13 shows a top plan schematic view of the embodiment of FIG. 12 without the head-worn locator device.

FIG. 12 shows another embodiment of a system for determining an indoor location of a user 100 in a schematic, perspective view. The system 100 corresponds to the system 1 explained in the preceding with reference to FIG. 1 with the following exceptions. According to the embodiment of FIG. 12, the shown transmitters 3 are arranged in a two-dimensional array on a ceiling 120 of an office building (not shown), i.e. in a corresponding "transmitter array plane". FIG. 13 shows a top plan schematic view of a section of ceiling 120. As will be apparent from FIG. 13, the transmitters 3 are arranged equidistant, i.e., according to a defined spacing of approx. 1 m.

Corresponding to the embodiment of FIG. 1, each transmitter 3 is programmed with location information that corresponds to a predefined physical location. However, the predefined physical location according to the present example is an absolute geographic position of the respective transmitter 3. Corresponding to the embodiment of FIG. 1, the respective location information comprises a location identifier (ID) and is provided by said transmitters 3 in respective optical location signals. The associated predefined physical locations are stored together with the location information again in a remote lookup database, which is stored in the central mapping server (not shown), as discussed above.

| Remote lookup database - Absolute geographic position | | |
|---|---|---|
| Transmitter No. | Predefined physical location | Location information (with location ID) |
| 3a | 36.986783, −122.036732 | 01011011 |
| 3b | 36.986804, −122.036722 | 00100010 |
| 3c | 36.986794, −122.036712 | 01010101 |

-continued

Remote lookup database - Absolute geographic position

| Transmitter No. | Predefined physical location | Location information (with location ID) |
|---|---|---|
| 3d | 36.986786, −122.036732 | 00000111 |
| 3e | 36.986786, −122.036734 | 00011110 |
| ... | ... | ... |
| ... | ... | ... |

Once the transmitters 3 are programmed, the LED controller 18 (not shown in FIGS. 12 and 13) of the respective transmitter 3 causes the corresponding LED modules 4 (also not shown in FIGS. 12 and 13) to emit the location information in optical location signals by digitally modulating the output light, provided that the respective LED modules 4 are in the ON state, i.e., that the general illumination in the part of the office building is switched on.

The operation during the determination of the location of headset 2, and thus the user, in the system 100 of FIGS. 12 and 13 corresponds to the embodiment of FIG. 1 according to the preceding discussion of FIG. 4. The smart phone of the user may use the predefined physical location according to the present example to show the user's location on a displayed map of the office building for indoor navigation purposes.

In case the camera module 11 of headset 2 determines multiple transmitters 3 to be present in the camera module's 11 field of view, the location information of all received location signals are transmitted to the smart phone and then to the mapping server (not shown) together with the relative position of the received location in the pixel video information. For example, the transmitted information may comprise:

| Location ID | Image x | Image y |
|---|---|---|
| 01011011 | 3 | 14 |
| 00100010 | 26 | 2 |

The mapping server interpolates the exact position of the headset 2 and thus the user using the known positions of the detected transmitters 3 according to the lookup table.

Figure 14:
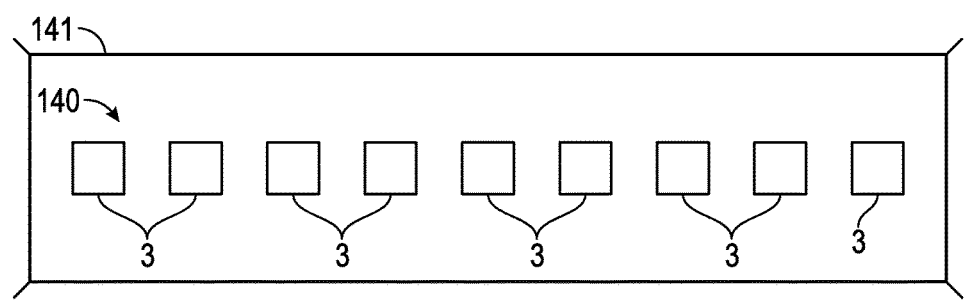
FIG. 14 shows a schematic, perspective view of a further embodiment of a system for determining an indoor location of a user with a linear array of transmitters.

Certainly, the system for determining an indoor location of a user 100 according to the embodiment of FIGS. 12 and 13 may comprise, in addition or instead of the two-dimensional array, provided on ceiling 120, one- or two-dimensional arrays provided in other transmitter array planes, such as on a floor, wall, or shelf of a building, for example in accordance with FIGS. 14 and/or 15.

FIG. 14 shows a schematic, perspective view of an embodiment of a linear array 140 of transmitters 3, arranged on a wall 141 of an office building (not shown).

Figure 15:
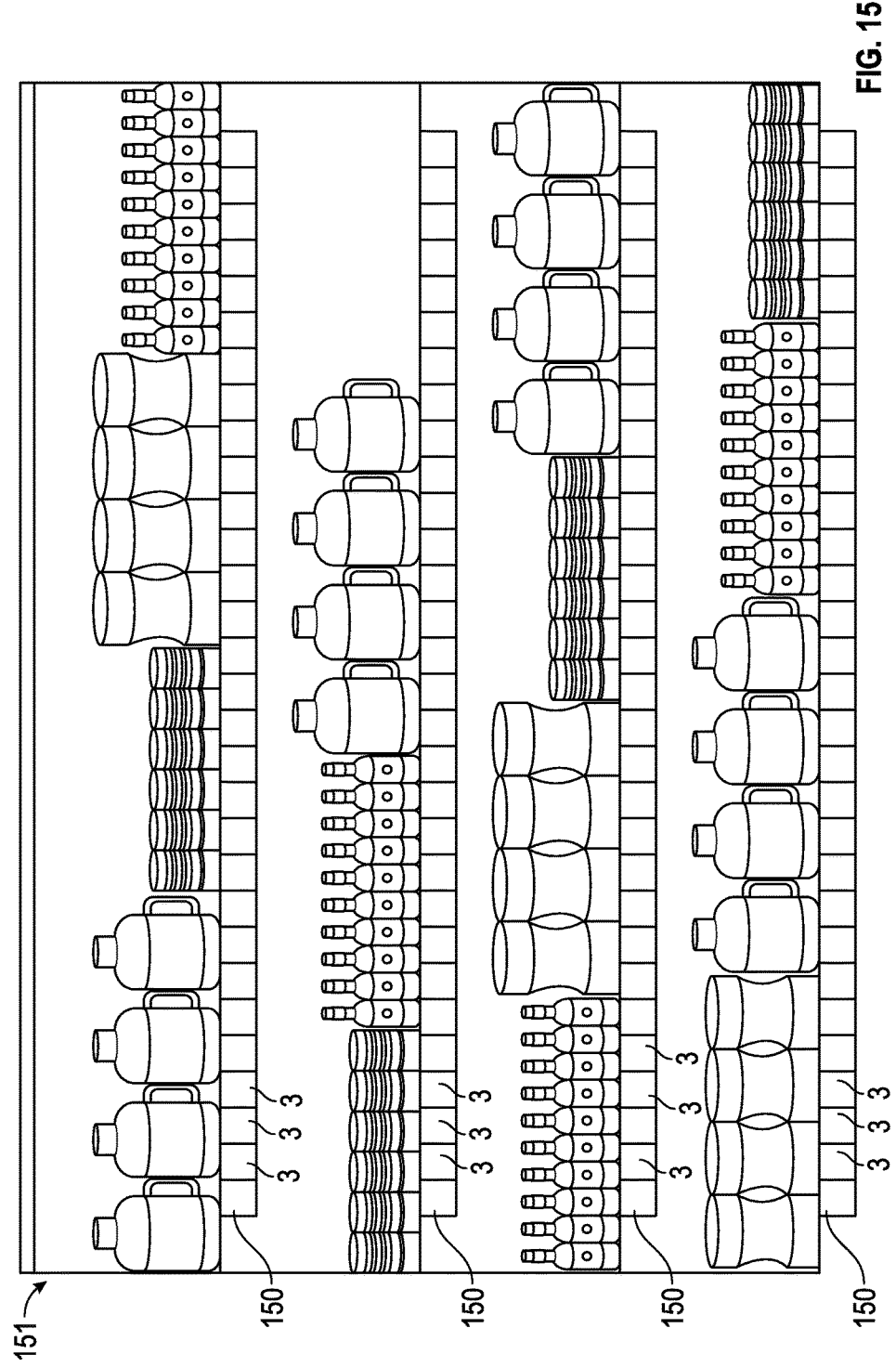
FIG. 15 shows a schematic view of a further embodiment of a system for determining an indoor location of a user with multiple linear arrays of transmitters.

FIG. 15 shows a schematic view of a shelf 151 of a grocery store. The shelf 151 comprises four linear arrays 150 of transmitters 3 at the various levels of shelf 151. The embodiment of FIG. 15 allows locating the user horizontally along the shelf 151 and in addition allows to determine which level of the shelf 151 the user is looking at, i.e., the vertical viewing angle of the user.

The operation of the embodiments of FIGS. 14 and 15 correspond to the embodiment of FIGS. 12 and 13, discussed in the preceding. Certainly, both embodiments require a headset with a forward facing camera or photodetector, such as discussed with reference to FIG. 7 or 16.

Figure 16:
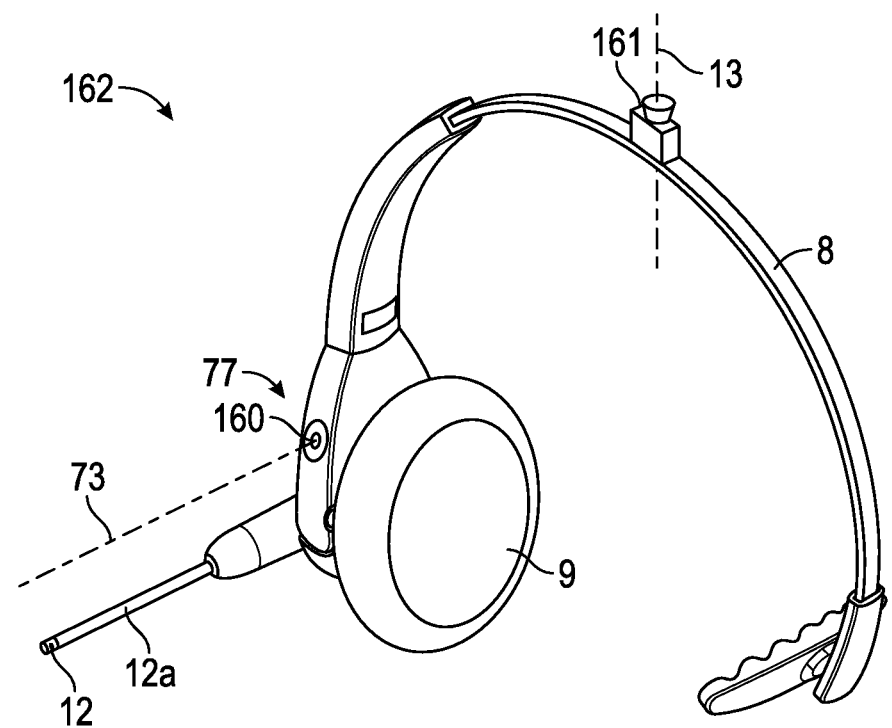
FIG. 16 shows a further embodiment of a head-worn locator device in a schematic perspective view.

FIG. 16 shows a headset 162, in particular for use in the embodiments of FIGS. 12-15 The headset 162 corresponds to headset 72 of FIG. 7 with the exception that the IR receiver is replaced by a horizontal camera module 160, as described with reference to FIG. 1. An additional vertical camera module 161 is provided on head band 8. FIG. 16 shows the camera module 161 with the optical axis 13 oriented vertically, e.g., for use in the embodiments of FIGS. 1, 6, 12 and 13. The camera module 160 provides a forward-facing orientation for use, e.g., in the embodiments of FIGS. 14 and 15.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment in which:
- the camera module 11, instead of being arranged on head band 8, is arranged on extension arm 12a of headset 2, 162,
- in addition to camera module 11 on head band 8, a further camera module is arranged on extension arm 12a of headset 2, 162,
- instead of providing one LED controller 18 in each transmitter 3, 93, a common LED controller drives all transmitters 3, 93 of the system 1 with the respective location data,
- transmitter 3, 93 does not comprise a network interface 19, and the location information is hard coded in memory 20 of the respective transmitter 3, 93,
- the communication interface 15 of headset 2, 52, 72, 162 is additionally or alternatively configured for Wi-Fi (IEEE 802.11) communication, cellular communication, or another RF communication protocol to connect to a smart phone or a different type of smart device or computing device,
- network interface 19 of transmitter 3, 93, instead of being configured for Ethernet communication, being configured for Wi-Fi (IEEE 802.11), Bluetooth, or Zigbee communication, or is configured for a different type of WAN (wide area network) and/or LAN (local area network) communication,
- instead of or additional to the LED modules 4 of transmitter 3, comprising white light LEDS, the LED modules 4 comprise color/RGB LEDs,
- instead of a location ID comprising 8 bits, the location ID comprises a different bit length, e.g., 16 bits or 32 bits,
- instead of digital amplitude modulated location information in the optical location signals, emitted by transmitters 3, 93, phase (e.g., phase shift keying), polarization and/or wavelength modulation is used for encoding the location information,
- each transmitter 3, 93 has a unique phase, amplitude, polarization, or wavelength that distinguishes its location and thus provides location information,
- instead of or additionally to the transmitters 3, 93 being configured for ceiling, wall, or shelf mounting, the transmitters 3, 93 being configured for floor mounting,
- the optical location signals comprise redundant location information, so that the location information can be derived from one of the optical location signals even if only part of said optical location signal is received,
- in the embodiment of FIG. 4, instead of or additionally to transmitting the location information to the smart phone, the location information is transmitted to a further device, such as, e.g., a computer, tablet, or a smart watch, having mapping memory or being connected to the mapping server, in the embodiment of FIG. 4, instead of transmitting the location information to the smart phone, the location information is transmitted directly to the mapping server by the headset 2, 52, 72, 162, in the embodiment of FIGS. 5 and 6, instead of the generation of the audio output by the headset 52 directly, the audio output is generated by a further device, such as, e.g., a computer, server, tablet, smart phone, or a smart watch, and then played to the user using the earphone drivers 9, 10 of headset 52, in the embodiment of FIG. 9, instead of the transmitters 93a-93c, an array of transmitters is used.

in the embodiment of FIGS. 12 and 13, instead of a spacing of the transmitters 3 of 1 m, a different spacing is used, such as a spacing between 0.1 m and 5 m, and/or in the embodiment of FIGS. 12 and 13, instead of the mentioned interpolation being conducted by the mapping server, the interpolation is conducted by microprocessor 14 of the headset 2 or by the smart phone.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A system for determining a location of a user, comprising
a plurality of transmitters, each associated with a predefined physical location and each comprising a light source to provide optical location signals; and
a headset with at least a headband, an earphone audio driver, a first optical receiver, and a second optical receiver, which headset is a head-worn locator device; wherein
said first optical receiver being oriented, at least during use, substantially vertical for receiving at least one of the optical location signals; and
said second optical receiver being oriented substantially perpendicular to the first optical receiver and aligned with the user's direction of view, so that at least a horizontal viewing angle of the user and a vertical viewing angle of the user can be determined, wherein
the transmitters are configured to provide location information in their respective optical location signal, wherein said location information corresponds to said predefined physical location of the respective transmitter.

2. The system according to claim 1, wherein said headset is additionally configured to provide audio feedback using the earphone audio driver, said audio feedback corresponding to the location information.

3. The system according to claim 2, wherein said audio feedback is provided upon the reception of location information.

4. The system according to claim 1, wherein the headset is configured to determine refined physical location data from received location information and the determined viewing angles.

5. The system according to claim 1, wherein said headset is additionally configured to provide audio feedback using the earphone audio driver corresponding to the determined viewing information.

6. The system according to claim 1, wherein the second optical receiver is configured to receive optical location signals of one or more further transmitters.

7. The system according to claim 6, wherein said one or more further transmitters are horizontally aligned.

8. The system according to claim 6, wherein said one or more further transmitters are wall-, furniture- or shelf-mountable transmitters.

9. The system according to claim 1, wherein said headset additionally comprises a wireless communications interface and is configured to transmit at least the received location information to a mapping device.

10. The system according to claim 1, wherein said headset comprises mapping memory with mapping information and said headset is configured to determine the predefined physical location of at least one of the plurality of transmitters by comparing said received location information with said mapping information.

11. The system according to claim 1, wherein the headset is configured to receive two or more optical location signals simultaneously.

12. The system according to claim 11, wherein the headset is configured to determine an intermediate physical location from said two or more optical location signals.

13. The system according to claim 1, wherein the location information provided by the plurality of transmitters corresponds to their respective absolute physical locations.

14. The system according to claim 1, wherein the first optical receiver is arranged substantially centered on the headband.

15. The system according to claim 1, wherein the headset is configured to transmit location information, received from one of or more of the plurality of transmitters, to a further device.

16. The system according to claim 15, wherein the further device is a mobile device.

17. A headset for use in a system for determining a location of a user, comprising at least a headband, an earphone audio driver, a first optical receiver, and a second optical receiver, which headset is a head-worn locator device; wherein
said first optical receiver being oriented, at least during use, substantially vertical for receiving at least one optical location signal; and
said at least one optical location signal comprises location information, corresponding to a predefined physical location; and wherein
the second optical receiver being oriented substantially perpendicular to the first optical receiver and aligned with the user's direction of view, so that at least a horizontal viewing angle of the user and a vertical viewing angle of the user can be determined.

* * * * *